Aug. 26, 1930.  J. B. GROSSWEGE  1,774,138
COMPRESSOR CONTROL DEVICE
Filed Jan. 4, 1927

INVENTOR
JOHN B. GROSSWEGE
BY *Wm. M. Cady*
ATTORNEY

Patented Aug. 26, 1930

1,774,138

UNITED STATES PATENT OFFICE

JOHN B. GROSSWEGE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

COMPRESSOR CONTROL DEVICE

Application filed January 4, 1927. Serial No. 158,880.

This invention relates to motor driven air compressors and more particularly to means for controlling the motor which drives the compressor.

In the so-called gas-electric motor cars, the car is propelled by electric motors which obtain their supply of electric current from an electric generator driven by a gasoline or oil reciprocating engine. The car is also equipped with a motor driven air compressor for supplying fluid under pressure for controlling the fluid pressure brakes on the car, and the current for the compressor motor is supplied from the generator. The voltage of the generator varies with the speed of the car, and consequently the voltage of the current supplied to the motor varies, with the result that the speed of the compressor varies.

Prior to moving a car, the air brake system should be charged with fluid under pressure. For this purpose the compressor is operated by starting the engine and running same at a slow speed. With the engine running at a slow speed, the voltage developed by the generator is correspondingly low, with the result that the motor speed and running speed of the air compressor is low, so that the rate of supply of fluid under pressure is reduced, with the result that the time required for charging the air brake system is prolonged, which delays the starting of the car and is therefore undesirable.

Also, in coasting down a grade, the power to the car motor is generally cut off and the engine is permitted to run idle, at the usual slow idling speed, with the resulting slow speed of the motor and the air compressor. Furthermore, under this condition of operation, it is customary to repeatedly apply and release the brakes, so that a greater amount of fluid under pressure is used than in ordinary level road service. With the compressor operating at a low speed, and a more than ordinary demand for fluid under pressure, there is danger that the supply of fluid under pressure will fall below the desired safety limit.

The principal object of my invention is to provide a motor controlling means for automatically effecting an increase in the speed of the compressor motor when the voltage of the generator is low.

Figure 1:
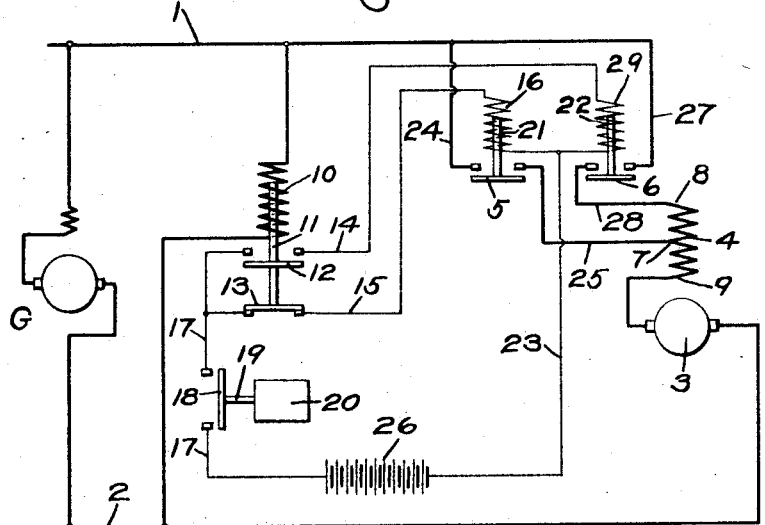
Figure 2:
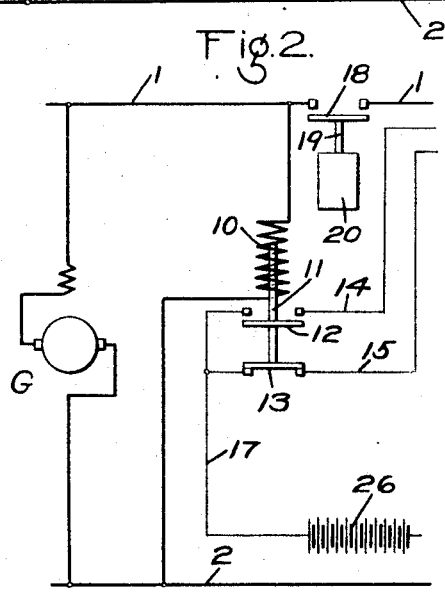

In the accompanying drawing; Fig. 1 is a diagrammatic view of a motor control system, embodying my invention; and Fig. 2 is a diagrammatic view, showing a slightly modified form of my invention.

According to the arrangement shown in Fig. 1 of the drawing, the equipment may comprise an electric generator G adapted to be driven by a gas or oil engine on a car, main leads 1 and 2 from the generator G being connected to the armature 3 of the compressor motor. One end of the field coil 4 of the motor is connected to the armature 3 and taps are taken from the field coil 4 at 7 and 8. The tap 7 is connected to the wire 25 leading to a switch contact controlled by a switch member 5, said switch contact being adapted to be connected through the switch member 5 with a switch contact connected to a wire 24 which connects with lead 1 of the generator. The contact member 5 is carried by a solenoid core 21, which is controlled by a coil 16.

The tap 8 is connected to a wire 28, leading to a switch contact controlled by a switch member 6, said switch contact being adapted to be connected through the switch member 6 with a switch contact connected to a wire 27, leading to the generator lead 1. The switch member 6 is carried by a solenoid core 22, which is controlled by a coil 29.

Connected across the generator leads 1 and 2 is a voltage relay device which comprises an operating coil 10, adapted to control the operation of a plunger 11. Mounted on said plunger are two switch members 12 and 13, switch member 12 being adapted to open the circuit through the control wire 14, when switch member 13 closes the circuit through the control wire 15, and when the switch member 12 closes the circuit through control wire 14, the switch member 13 opens the circuit through control wire 15.

The control circuit wire 14 is connected to one terminal of the coil 29 and the control circuit wire 15 is connected to one terminal of coil 16. The other terminals of the coils 16 and 29 are connected to a common wire 23 which is connected to a battery, or other source of current supply 26.

The control circuit wires 14 and 15 are connected through the switch members 12 and 13 with a common wire 17, which leads to one terminal of the battery 26 and the circuit through the wire 17 is controlled by a pump governor switch device which may comprise means, indicated diagrammatically by the reference numeral 20, for operating a plunger 19 carrying a switch contact member 18. When the pressure of fluid supplied to the usual storage reservoir by the operation of the compressor falls below a predetermined pressure, the plunger 19 is operated to cause the switch member 18 to close the circuit through the wire 17.

In operation, when the engine driving the generator, is running at a low speed, such as in idling, the voltage developed by the generator G and impressed on the operating coil 10 of the voltage relay device, is insufficient to operate the plunger 11 so that the switch members 12 and 13 remain in the position shown in the drawing, in which the switch member 13 closes the circuit from wire 17 to wire 15, while the switch member 12 opens the circuit from wire 17 to wire 14.

When the pressure of the stored fluid compressed by the compressor falls to a predetermined degree, the governor device 20 operates to shift the switch 18, so as to close the control circuit from the battery 26 through wire 17, switch member 13, wire 15, switch coil 16 and return wire 23. The circuit through the coil 16 causes the solenoid core 21 to operate so as to close the switch contact member 5, thereby completing a circuit from the generator lead through wire 24 and wire 25 to the field coil 4 at the intermediate tap 7, thence through the compressor motor armature 3 and to the generator lead 2. Under this condition only a portion of the field coil 4 is cut into the main circuit, so that as a result the compressor motor is operated at a high speed.

When the pressure of fluid compressed by the compressor has been increased to a predetermined maximum degree, the compressor governor device 20 operates to cause the switch 18 to be shifted to the position shown in the drawing, in which the circuit through wire 17 is opened, which then causes the de-energization of the switch coil 16, so that the solenoid core 21 moves the switch member 5 to the open position, as shown in the drawing, in which position the generator circuit through wires 24 and 25 to the field coil 4 is opened, thus cutting off the supply of current to the compressor motor and stopping the air compressor.

When the speed of the engine is increased to a sufficient degree and the generator voltage is increased a corresponding degree, said increased voltage being impressed on the voltage relay coil 10 causes the relay to operate and shift the plunger 11 and contact members 12 and 13 to a position in which the contact member 12 connects wires 17 and 14, while the contact member 13 breaks the connection between wires 17 and 15.

Then, when the governor device 20 operates to close the switch member 18, as hereinbefore described, the control circuit is completed through wires 17 and 14 to the switch coil 29 and thence through the return wire 23. Passage of current through the coil 29 causes the solenoid core 22 to operate and shift the switch member 6 so as to close the main circuit from the wire 27 to the wire 28 and thence to the tap 8 on the field coil 4. The generator current from lead 1, entering the field coil 4 at the tap 8 flows through the entire field coil, thus causing the air compressor motor to operate at a lower speed, than if the current flowed through only a portion of the field coil.

It will be seen from the above description that with my invention the speed of the compressor motor is increased when the generator is running at a low speed and the voltage is low, causing the compressor to operate at a higher speed so as to provide a higher rate of supply of fluid under pressure, and thus ensuring against a possible excessive loss of fluid pressure supply.

Instead of controlling the circuit through the control circuit wire 17, as shown in Fig. 1, the compressor switch governor device may control the circuit through the generator lead 1, as shown in Fig. 2. In either case, the operation will be the same, as will be evident.

Having now described my invention, what I claim as new and desire to secure by Letters Patent, is:—

1. The combination with a vehicle carried electric motor and a vehicle carried electric generator for supplying current for operating the motor, of means responsive to a predetermined drop in the voltage of the generator for automatically causing said motor to run at an increased speed.

2. The combination with a vehicle carried electric motor and a vehicle carried electric generator for supplying current to said motor, of means operating upon a predetermined drop in the voltage of the generator for automatically causing the generator current to flow through only a portion of the field coils of the motor, to thereby cause the motor to run at an increased speed.

3. The combination with an electric motor and an electric generator for supplying current to said motor, of an electrically controlled switch device operative to connect the whole field coil of the motor into the generator circuit, an electrically controlled switch device operative to connect only a portion of the field coil into the generator circuit, and an electrically controlled relay switch automatically operative upon a predetermined increase or decrease in the generator voltage for cutting in one or the other of said electrically controlled switch devices.

In testimony whereof I have hereunto set my hand.

JOHN B. GROSSWEGE.